US012154708B2

(12) United States Patent
Yen et al.

(10) Patent No.: US 12,154,708 B2
(45) Date of Patent: Nov. 26, 2024

(54) INDUCTOR DEVICE

(71) Applicant: Realtek Semiconductor Corporation, Hsinchu (TW)

(72) Inventors: Hsiao-Tsung Yen, Hsinchu (TW); Ka-Un Chan, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 701 days.

(21) Appl. No.: 17/236,232

(22) Filed: Apr. 21, 2021

(65) Prior Publication Data

US 2021/0398727 A1 Dec. 23, 2021

(30) Foreign Application Priority Data

Jun. 19, 2020 (TW) ................................ 109120892

(51) Int. Cl.
*H01F 27/28* (2006.01)
*H01F 27/00* (2006.01)
*H01F 27/29* (2006.01)

(52) U.S. Cl.
CPC ....... *H01F 27/006* (2013.01); *H01F 27/2823* (2013.01); *H01F 27/29* (2013.01)

(58) Field of Classification Search
CPC ............. H01F 17/0013; H01F 17/0006; H01F 27/2804; H01F 2027/2809; H01F 5/003; H01F 27/006; H01F 27/2823; H01F 27/29; H01F 2017/046
USPC .................................................. 336/200, 232
See application file for complete search history.

(56) References Cited

U.S. PATENT DOCUMENTS

| | | | |
|---|---|---|---|
| 9,824,812 | B2 | 11/2017 | Huang et al. |
| 10,153,078 | B2 | 12/2018 | Yen et al. |
| 10,186,364 | B2 | 1/2019 | Yen et al. |
| 2019/0221350 | A1 | 7/2019 | Yen et al. |
| 2019/0279809 | A1 | 9/2019 | Yen |
| 2019/0392980 | A1 | 12/2019 | Yen |
| 2020/0312511 | A1 | 10/2020 | Yen et al. |
| 2020/0312512 | A1 | 10/2020 | Yen et al. |

FOREIGN PATENT DOCUMENTS

| | | | | | |
|---|---|---|---|---|---|
| CN | 102110517 | A | * | 6/2011 | |
| KR | 2001011350 | A | * | 2/2001 | ......... H01F 17/0013 |
| KR | 2019076606 | A | * | 7/2019 | .......... H01F 27/006 |

* cited by examiner

*Primary Examiner* — Tszfung J Chan
(74) *Attorney, Agent, or Firm* — Locke Lord LLP; Tim Tingkang Xia, Esq.

(57) ABSTRACT

An inductor device includes a first coil, a second coil and a toroidal coil. The first coil is partially overlapped with the second coil in a vertical direction. The toroidal coil is disposed outside the first coil and the second coil. The first coil is interlaced with the second coil at a first side and a second side of the inductor device.

20 Claims, 8 Drawing Sheets

INDUCTOR DEVICE

CROSS-REFERENCE TO RELATED APPLICATION

The present application claims priority to Taiwan Application Serial Number 109120892, filed Jun. 19, 2020, which is incorporated herein by reference in its entirety.

BACKGROUND

Technical Field

The present disclosure relates to an electronic device. More particularly, the present disclosure relates to an inductor device.

Description of Related Art

The existing various types of inductor device have their advantages and disadvantages. For example, a spiral inductor has higher quality factor value and mutual inductance value, but the mutual inductance and coupling are occurred between the wires. The 8-shaped stacked inductor device has better symmetry but with lower inductance per unit area. Therefore, the scope of application of inductors mentioned above is limited.

SUMMARY

In order to solve the problem mentioned above, the present disclosure provides an inductor device including a first coil, a second coil and a toroidal coil. The first coil is partially overlapped with the second coil in a vertical direction. The toroidal coil is disposed outside the first coil and the second coil. The first coil is interlaced with the second coil at a first side and a second side of the inductor device.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
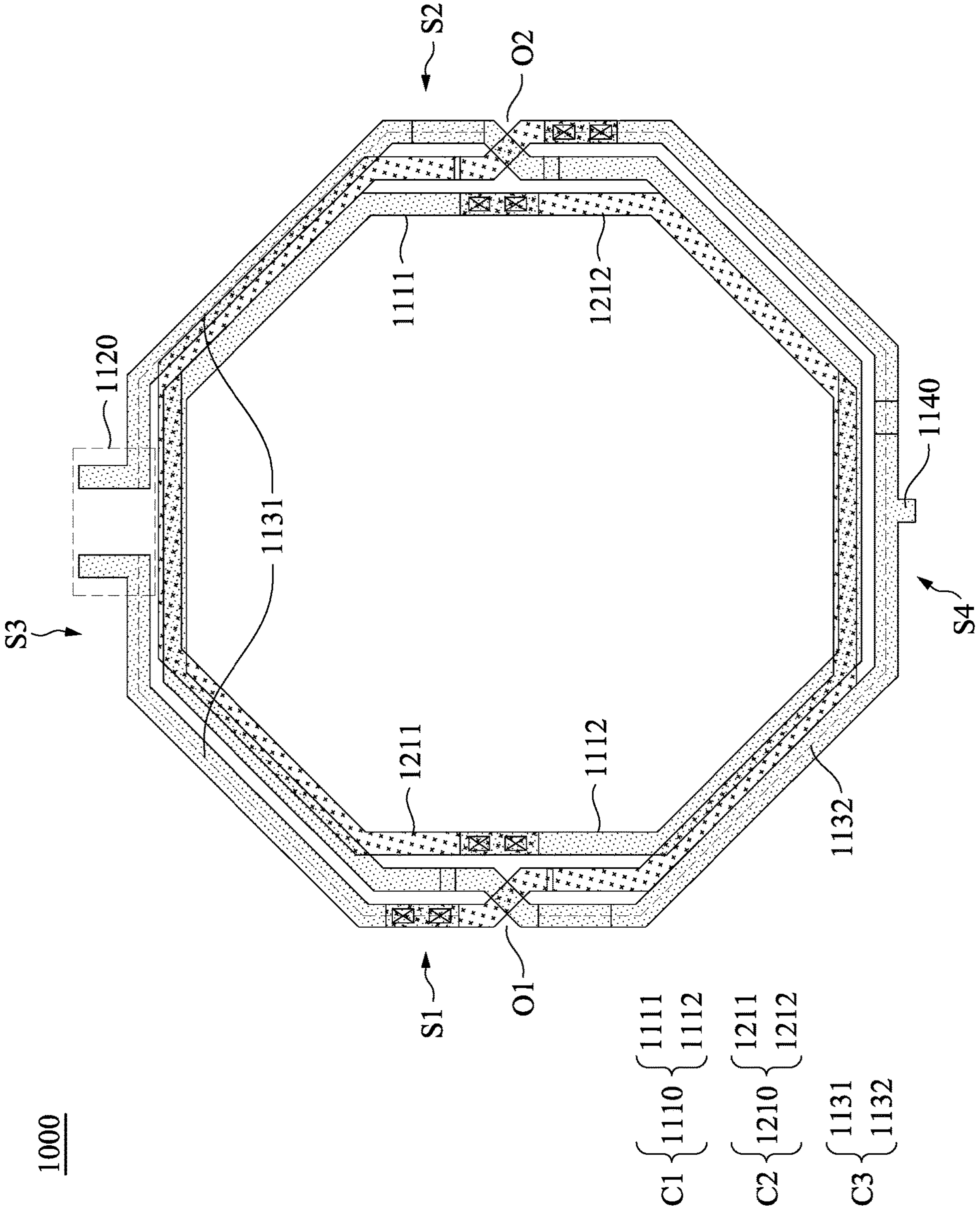
FIG. 1 is a schematic diagram illustrating an inductor device, in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms first, second, third etc. may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present disclosure.

The terms herein are used for describing particular embodiments and are not intended to be limited thereto. Single forms such as "a," "this," "the," as used herein also include the plurality form.

In the description herein and throughout the claims that follow, the terms "coupled" or "connected" in this document may be used to indicate that two or more elements physically or electrically contact with each other, directly or indirectly. They may also be used to indicate that two or more elements cooperate or interact with each other.

In the description herein and throughout the claims that follow, the terms "comprise," or "comprising," "include," or "including," "have," or "having," "contain," or "containing," and the like used herein are to be understood to be open-ended, i.e., to mean including but not limited to.

In the description herein and throughout the claims that follow, the phrase "and/or" includes any and all combinations of one or more of the associated listed claims.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
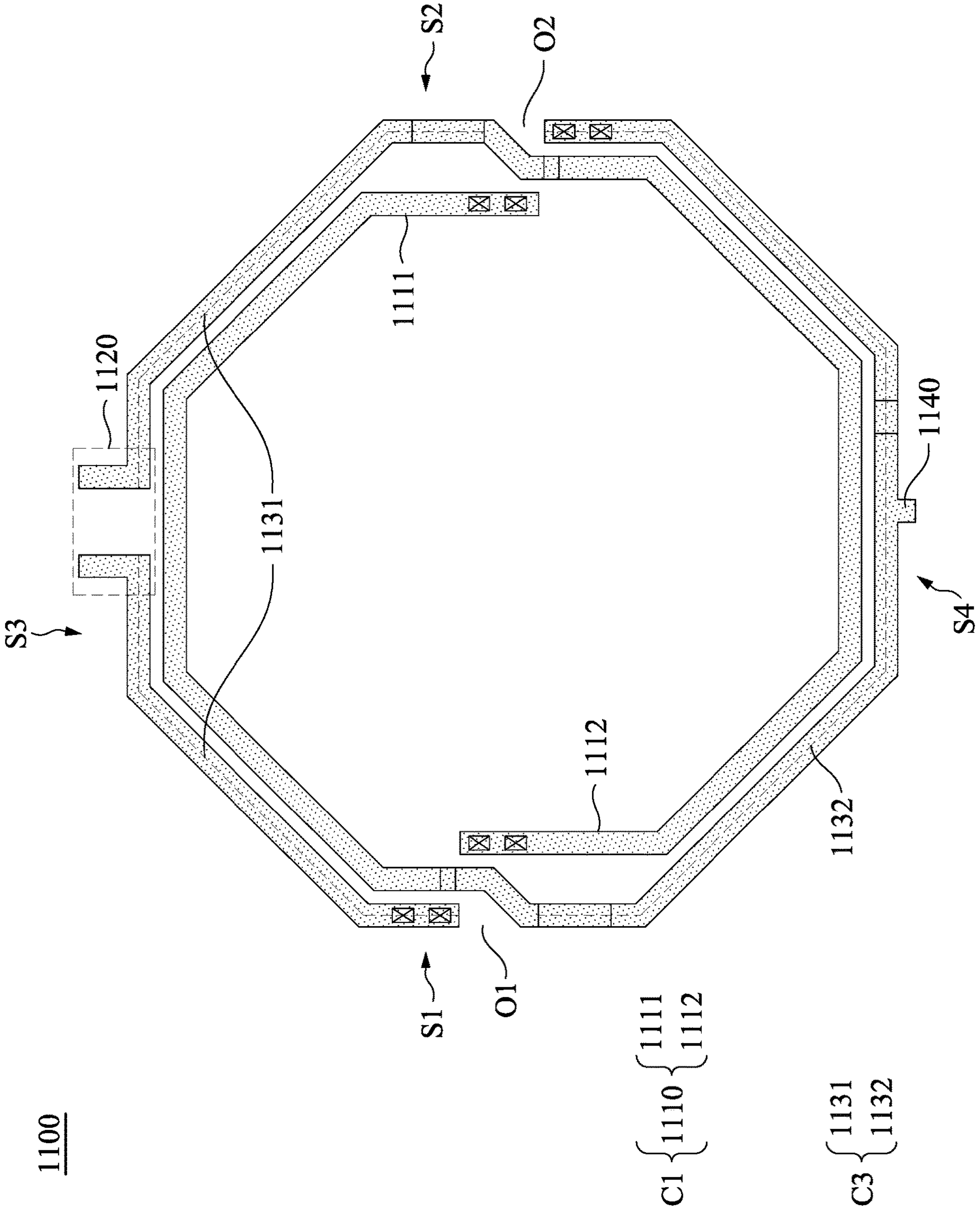
FIG. 2 is a schematic diagram illustrating a partial structure of the inductor device shown in FIG. 1, in accordance with some embodiments of the present disclosure.
Figure 3:
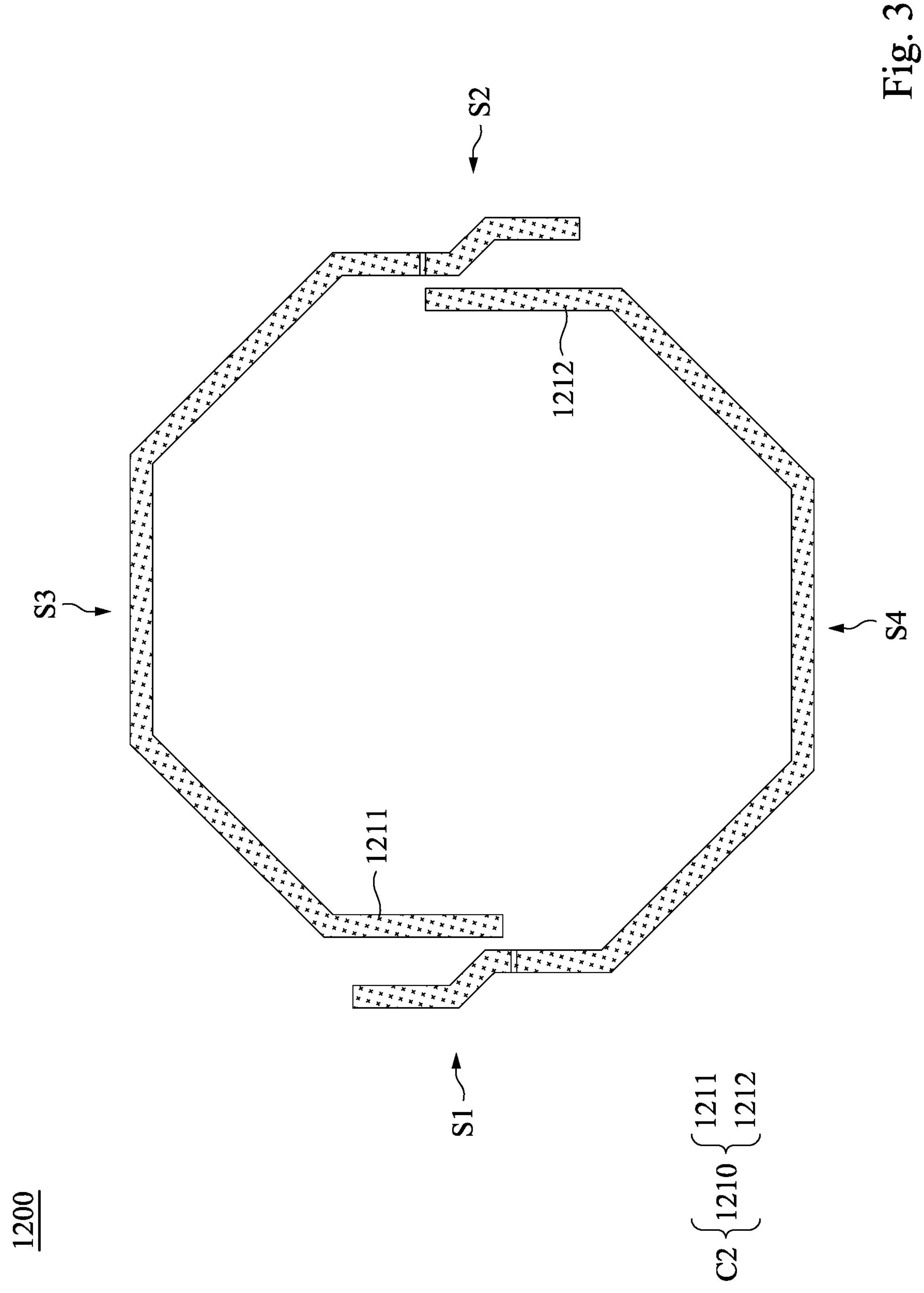
FIG. 3 is a schematic diagram illustrating a partial structure of the inductor device shown in FIG. 1, in accordance with some embodiments of the present disclosure.

References are now made to FIG. 1 to FIG. 3. FIG. 1 is a schematic diagram illustrating an inductor device 1000, in accordance with some embodiments of the present disclosure. FIG. 2 and FIG. 3 are schematic diagrams illustrating a partial structure of the inductor device 1000 shown in FIG. 1, respectively, in accordance with some embodiments of the present disclosure. As shown in FIG. 1 to FIG. 3, the inductor device 1000 includes a first coil C1, a second coil C2, and a toroidal coil C3. The second coil C2 is at least partially overlapped with the first coil C1 in a vertical direction. The toroidal coil C3 is disposed outside the first coil C1 and the second coil C2. In some embodiments, the toroidal coil C3 can be disposed outermost the inductor device 1000, as shown by part of the coil illustrated with the dotted line.

In some embodiments, the first coil C1 is interlaced with the second coil C2 on a first side S1 and a second side S2 of the inductor device 1000. In detail, an upper half 1111 of the first coil C1 is interlaced with a lower half 1212 of the second coil C2 on the first side S1 of the inductor device 1000, and a lower half 1112 of the first coil C1 is interlaced with an upper half 1211 of the second coil on the second side S2 of the inductor device 1000. In some embodiments, the first side S1 and the second side S2 are disposed on opposite sides of the inductor device 1000. In some embodiments, the first side S1 is left-hand side in the figure, and the second side S2 is right-hand side in the figure.

In some embodiments, the second coil C2 can be disposed above the first coil C1 or below the first coil C1.

In some embodiments, the first coil C1 is disposed on a first metal layer, which is illustrated with dotted grid, the second coil C2 is disposed on a second metal layer, which is illustrated with cross-star grid. The first metal layer is different from the second metal layer. In some embodiments, the toroidal coil C3 and the first coil C1 are disposed on the same metal layer (e.g., the first metal layer illustrated with dotted grid).

In some embodiments, the first coil C1 is wound out clockwise or counterclockwise from the innermost circle of the inductor device 1000. For example, the upper half 1111 of the first coil C1 is wound counterclockwise, from the innermost circle of the inductor device 1000 on the second side S2 (e.g., right hand side in figure), to the first side S1 of the inductor device 1000 (e.g., left hand side in figure), and is wound out to the outer circle on the first side S1 of the inductor device 1000. The lower half 1112 of the first coil C1 is wound counterclockwise from the innermost circle of the inductor device 1000 on the first side S1 (e.g., left hand side in figure), and is wound out to the outer circle on the second side S2 of the inductor device 1000.

In some embodiments, when the first coil C1 is wound counterclockwise as mentioned above, the second coil C2 is wound out clockwise from the innermost circle of the inductor device 1000. In detail, the upper half 1211 of the second coil C2 is coupled to the lower half 1112 of the first coil C1 on the first side S1 (e.g., left hand side in figure) of the inductor device 1000 through a via, and is wound clockwise from the innermost circle on the first side S1 of the inductor device 1000, to the second side S2 of the inductor device 1000 (e.g., right hand side in figure), and is wound to the outer circle of the inductor device 1000 on the second side S2. The lower half 1212 of the second coil C2 is coupled to the upper half 1111 of the first coil C1 through a via, on the second side S2 of the inductor device 1000 (e.g., right hand side in figure), and is wound clockwise from the innermost circle on the second side S2 of the inductor device 1000 to the first side S1 of the inductor device 1000 (e.g., left hand side in figure), and is wound to the outer circle on the first side S1 of the inductor device 1000.

In some embodiments, when the first coil C1 is wound clockwise, the second coil C2 is wound out counterclockwise from the innermost circle of the inductor device 100. Configurations of the first coil C1 and the second coil C2 are similar to the description mentioned above, which will not be described repeatedly herein for simplicity of illustration.

In some embodiments, the toroidal coil C3 includes an upper half 1131 and a lower half 1132, which form an opening O1 on the first side S1 of the inductor device 1000. One terminal of the opening O1 (e.g., the upper half 1131 of the toroidal coil C3) is coupled to the second coil C2 (e.g., the lower half 1212 of the second coil C2), and the other terminal of the opening O1 (e.g., the lower half 1132 of the toroidal coil C3) is coupled to the first coil C1 (e.g., the upper half 1111 of the first coil C1). In some embodiments, the toroidal coil C3 form an opening O2 on the second side S2 of the inductor device 1000. One terminal of the opening O2 (e.g., the upper half 1131 of the toroidal coif C3) is coupled to the first coil C1 (e.g., the lower half 1112 of the first coil C1), and the other terminal of the opening O2 (e.g., the lower half 1132 of the toroidal coil) is coupled to the second coil C2 (e.g., the upper half 1211 of the second coil C2).

In some embodiments, the inductor device 1000 includes an input/output terminal 1120. The input/output terminal 1120 is disposed on a third side S3 (e.g., upper side in figure) of the inductor device 1000, and is configured to input or output current. In this embodiment, the input/output terminal 1120 is disposed on the upper half 1131 of the toroidal coil C3.

In some embodiments, the inductor device 1000 includes a center-tapped terminal 1140, which is disposed on a fourth side S4 (e.g., lower side in figure) of the inductor device 1000. In some embodiments, the center-tapped terminal 1140 is coupled to the lower half 1132 of the toroidal coil C3, as shown in the figure. In some embodiments, the center-tapped terminal 1140 can be coupled to the second coil C2 or the first coil C1 (not shown in figure) depending on practical needs.

In some embodiments, the third side S3 and the fourth side S4 of the inductor device 1000 mentioned above are located on opposite sides of the inductor device 1000. In some embodiments, the third side S3 is upper side in figure, and the fourth side S4 is lower side in figure. In some embodiments, the first side S1 and the second side S2 are in a horizontal direction in the figure, and the third side S1 and the fourth side S4 are in a vertical direction in the figure. Therefore, the first side S1 and the second side S2 are completely or substantially vertical.

Figure 4:
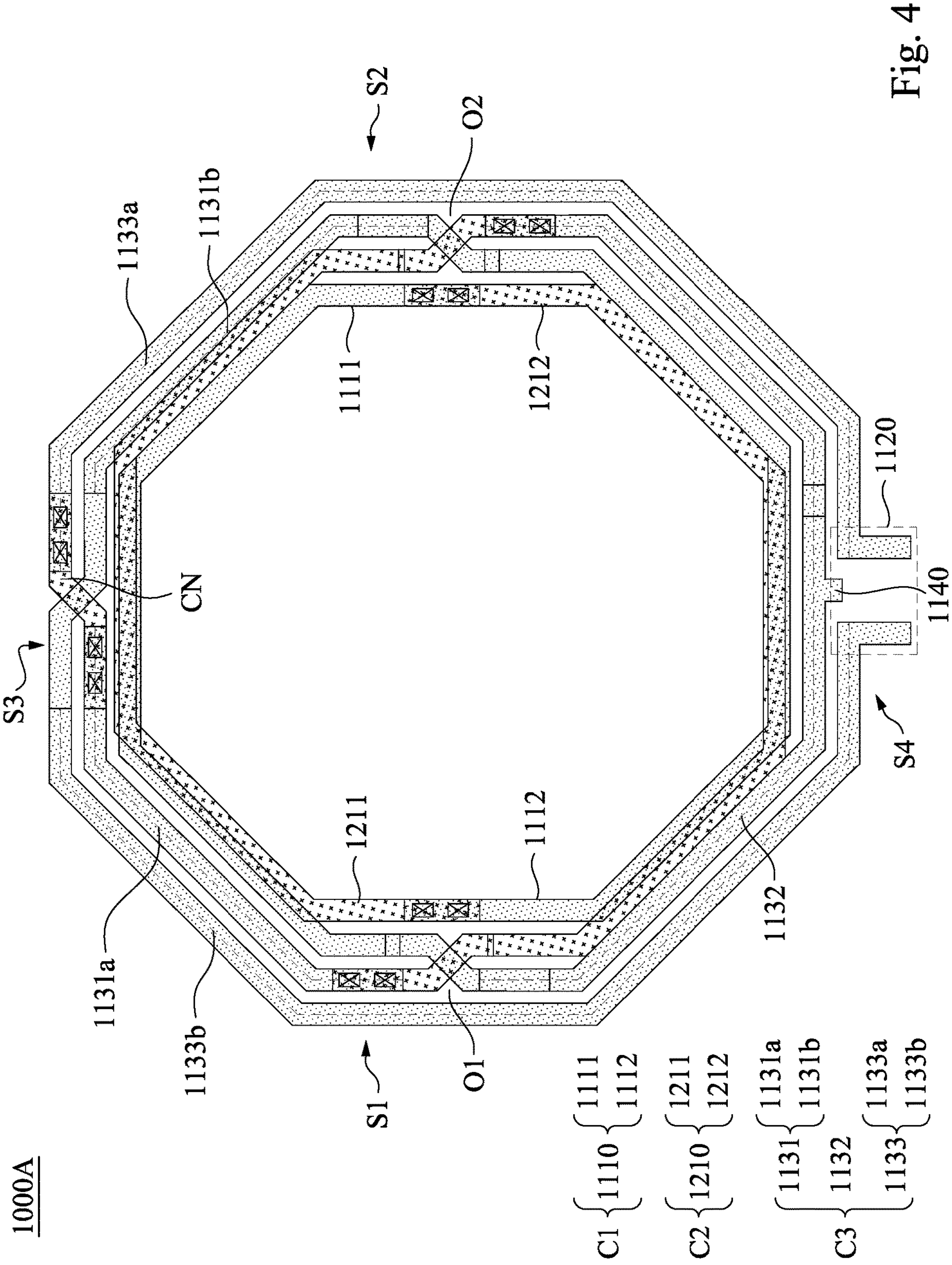
FIG. 4 is a schematic diagram illustrating an inductor device, in accordance with some other embodiments of the present disclosure.

Reference is now made to FIG. 4. FIG. 4 is a schematic diagram illustrating an inductor device 1000A, in accordance with some embodiments of the present disclosure. Same components are denoted by the same reference numerals in FIG. 4 and FIG. 1. The input/output terminal 1120 and the center-tapped terminal 1140 are disposed on same side of the inductor device 1000A, which is different from the inductor device 1000 shown in FIG. 1. Also, the configuration of the toroidal coil C3 shown in FIG. 4 is different from which shown in FIG. 1. Except for the aforementioned elements and corresponding description as follow, other configurations of the inductor device 1000A shown in FIG. 4 are same as or similar to the inductor device 1000 shown in FIG. 1, which will not be described repeatedly herein.

In some embodiments, the input/output terminal 1120 and the center-tapped terminal 1140 are disposed on the fourth side S4 of the inductor device 1000A (e.g., lower side in figure), and the input/output terminal 1120 is configured to input or output current. In this embodiment, the input/output terminal 1120 is disposed on the lower half of the toroidal coil C3.

In aforementioned embodiments, the toroidal coil C3 includes the upper half 1131 of an inner wire, the lower half 1132 of the inner wire, and an outer wire 1133, in which the outer wire 1133 is disposed on the outermost circle of the inductor device 1000A. In some embodiments, the upper half 1131 of the inner wire of the toroidal coil C3 includes a first portion 1131*a* and a second portion 1131*b*, and the outer wire 1133 of the toroidal coil C3 includes a first portion 1133*a* and a second portion 1133*b*. In some embodiments, the first portion 1131*a* of the upper half 1131 of the inner wire, and the second portion 1133*b* of the outer wire 1133, are disposed on the first side S1 of the inductor device 1000A (e.g., left-hand side in the figure). In some embodiments, the second portion 1131*b* of the upper half 1131 of the inner wire, and the first portion 1133*a* of the outer wire 1133, are disposed on the second side S2 the inductor device 1000A (e.g., right-hand side in the figure). In some embodiments, the first portion 1133*a* and the second portion 1133*b* of the outer wire 1133 are coupled to the input/output terminal 1120.

As shown in FIG. 4, in some embodiments, the second portion 1131*b* of the upper half 1131 of the inner wire disposed on inner side is coupled to the second portion 1133*b* of the outer wire 1133 disposed on the outermost circle. Because that the second portion 1131*b* and the second portion 1133*b* are disposed on the same metal layer, they can be connected without a connector (or a via). The inductor device 1000A includes a connector CN, which is disposed on a metal layer different from the toroidal coil C3. A terminal of the connector CN is coupled to the first portion 1131*a* of the upper half 1131 of the inner wire through a via, and the other terminal of the connector CN is coupled to the first portion 1133*a* of the outer wire 1133. The connecting part of the second portion 1131*b* of the upper half 1131 of the inner wire and the second portion of the outer wire 1133 is interlaced with the connector CN.

However, the present disclosure is not limited to the embodiments shown in FIG. 4, in some other embodiments, the connector CN can be coupled to the second portion 1131*b* of the upper half 1131 in the inner wire to the second portion 1133*b* of the outer wire 1133 through a via. In addition, the first portion 1131*a* of the upper half 1131 in the inner wire can be coupled to the first portion 1133*a* of the outer wire 1133 disposed on the outermost circle. In this way, the interlacing area of the first portion 1131*a* of the upper half 1131 in the inner wire and the first portion 1133*a* of the outer wire 1133, can be interlaced with the connector CN.

Figure 5:
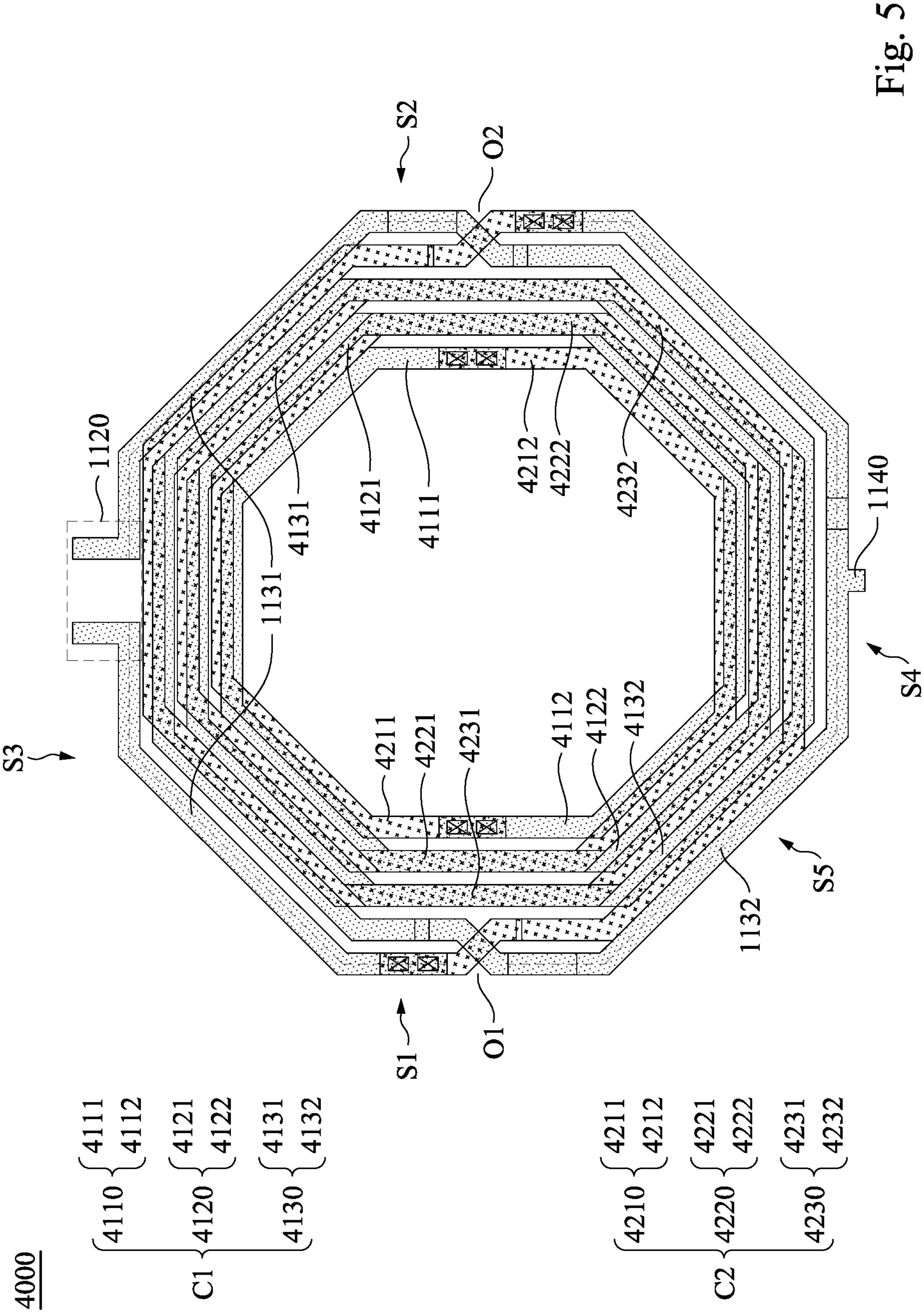
FIG. 5 is a schematic diagram illustrating an inductor device, in accordance with some other embodiments of the present disclosure.

Reference is now made to FIG. 5. FIG. 5 is a schematic diagram illustrating an inductor device 4000, in accordance with some embodiments of the present disclosure. Same components are denoted by the same reference numerals in FIG. 5 and FIG. 1. The first coil C1 of the inductor device 4000 shown in FIG. 5 includes first wires 4110, 4120, and 4130, and the second coil C2 of the inductor device 4000 shown in FIG. 5 includes second wires 4210, 4220, and 4230, which are different from the inductor device 1000 shown in FIG. 1. Each of the first wires 4110, 4120, and 4130 and the second wires 4210, 4220, and 4230 includes an upper half and a lower half (e.g., the first wire 4110 includes an upper half 4111 and a lower half 4112, and the first wire 4120 includes an upper half 4121 and a lower half 4122, and the first wire 4130 includes an upper half 4131 and a lower half 4132, and the second wire 4210 includes an upper half 4211 and a lower half 4212, and the second wire 4220 includes an upper half 4221 and a lower half 4222, and the second wire 4230 includes an upper half 4231 and a lower half 4232). Except for the aforementioned elements and corresponding description as follow, other configurations of the inductor device 4000 are same as or similar to the inductor device 1000, which will not be described repeatedly herein.

In some embodiments, at least one of the second wires is completely overlapped with at least one of the first wires on the first side S1 of the inductor device 4000. For example, the upper half 4221 of the second wire 4220 is completely overlapped with the upper half 4111 of the first wire 4110 on the first side S1 of the inductor device 4000. In some embodiments, the lower half 4222 of the second wire 4220 can also be completely overlapped with the lower half 4132 of the first wire 4130 on the first side S1 of the inductor device 4000.

In some embodiments, at least one of the second wires (e.g., the second wire 4215) is completely overlapped with at least one of the first wires (e.g., the first wire 4115), on the second side S2 of the inductor device 4000. For example, the upper half 4221 of the second wire 4220 is completely overlapped with the upper half 4131 of the first wire 4110 on the second side S2 of the inductor device 4000. In some embodiments, the lower half 4222 of the second wire 4220 can be completely overlapped with the lower half 4112 of the first wire 4110 on the second side S2 of the inductor device 4000.

In some embodiments, the lower half 4112 of the first wire 4110 is coupled to the upper half 4211 of the second wire 4210 at the innermost circle on the first side S1 of the inductor device 4000. In some embodiments, the upper half 4111 of the first wire 4110 is coupled to the lower half 4212 of the second wire 4210 at the innermost circle on the second side S2 of the inductor device 4000.

In some embodiments, at least one of the second wires is partially overlapped with two of the first wires on a fifth side S5 of the inductor device 4000. For example, the lower half 4222 of the second wire 4220 is partially overlapped with the lower half 4122 of the first wire 4120 and the lower half 4132 of the lower half 4122 on the fifth side S5 of the inductor device 4000.

In some embodiments, one of the second wires (e.g., the lower half 4212 of the second wire 4210) can be adjacent to but not overlapped with one of the first wires (e.g., the lower half 4122 of the first wire 4120) on the fifth side S5 of the inductor device 4000 (not shown in figure).

In some embodiments, the fifth side S5 of the inductor device 4000 is a side of the inductor device 4000 between the first side S1 and the fourth side S4. In some embodiments, the fifth side S5 can be located between the second side S2 and the third side S3, between the second side S2 and the fourth side S4, and/or between the first side S1 and the second side S2, of the inductor device 4000. For simplicity of illustration, please refer to the configuration shown in FIG. 5, which will not be described repeatedly herein.

Figure 6:
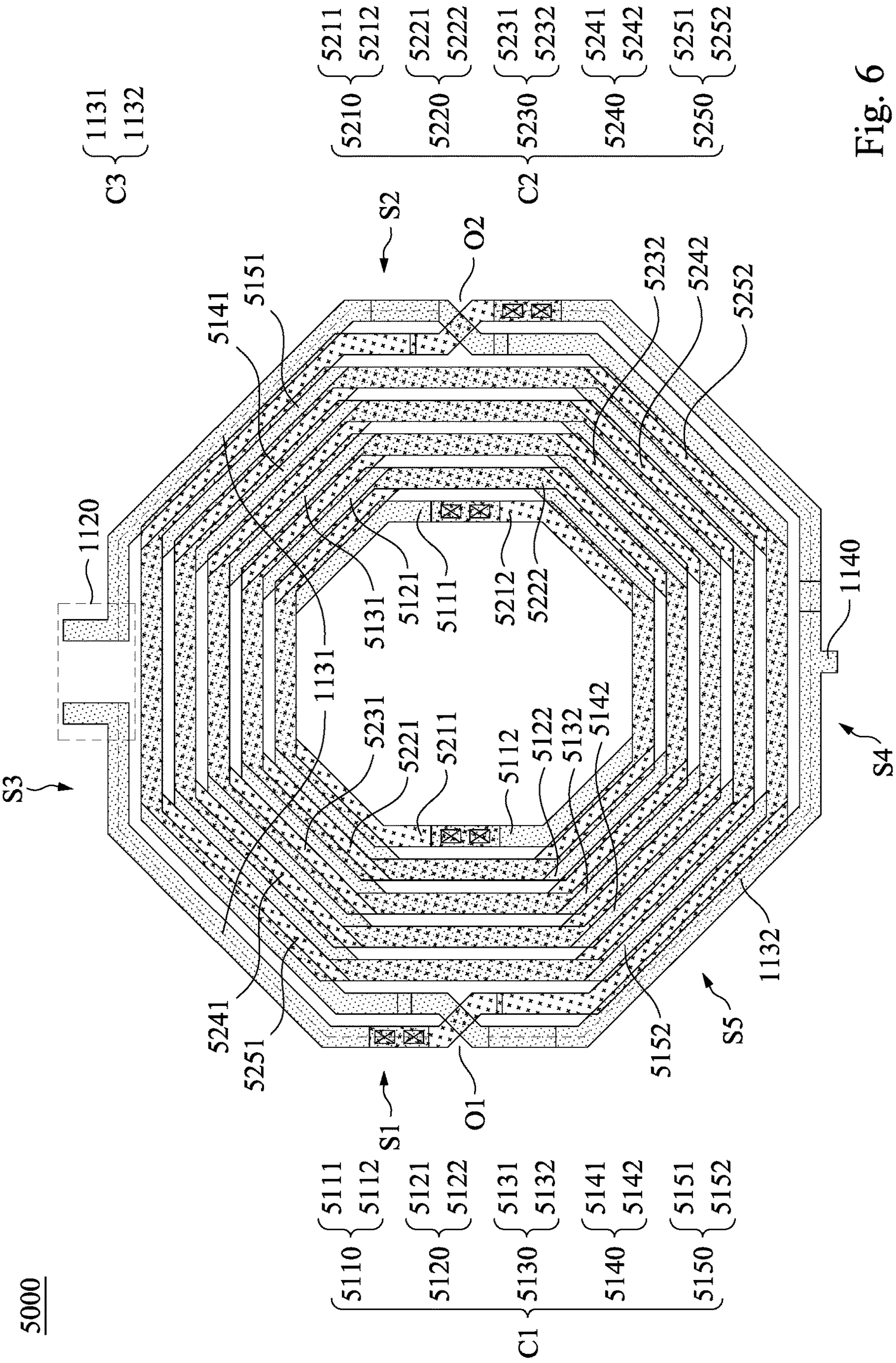
FIG. 6 is a schematic diagram illustrating an inductor device, in accordance with some other embodiments of the present disclosure.

FIG. 6 is a schematic diagram illustrating an inductor device 5000, in accordance with some embodiments of the present disclosure. The first coil C1 and the second coil C2 of the inductor device 5000 includes more first wires and second wires, which are different from the inductor device 4000 shown in FIG. 5. For example, the first coil C1 of the inductor device 5000 shown in FIG. 6 includes first wires 5110, 5120, 5130, 5140 and 5150, and the second coil C2 includes second wires 5210, 5220, 5230, 5240 and 5250. Each of the first wires 5110~5150 and the second wires 5210~5250 includes an upper half and a lower half. For example, the first wire 5110 includes an upper half 5111 and a lower half 5112, and so forth). Except for differences of the number of the first wires and the second wires, other structural configurations and connections of the inductor device 5000 are similar to the inductor device 4000, which will not be described repeatedly herein.

In some embodiments, the inductor device 1000, the inductor device 1000A, the inductor device 4000, and the inductor device 5000 shown in FIGS. 1~6 are structures with substantially central symmetry.

Figure 7:
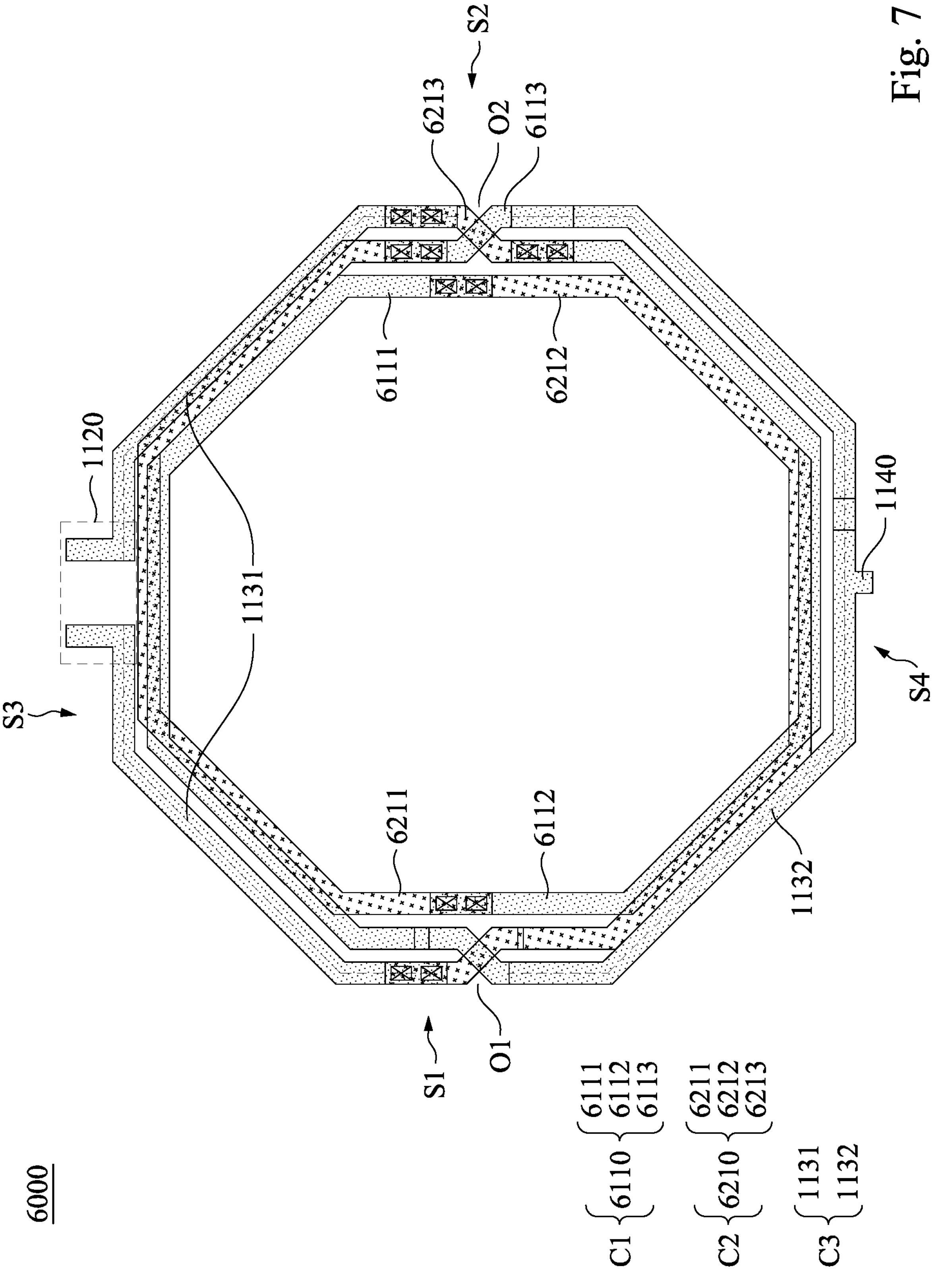
FIG. 7 is a schematic diagram illustrating an inductor device, in accordance with some other embodiments of the present disclosure.

FIG. 7 is a schematic diagram illustrating an inductor device 6000, in accordance with some embodiments of the present disclosure. Configuration of the second side S2 of the inductor device 5000 is different from the inductor device 1000. Except for further description as follow, other configurations of the inductor device 6000 are same as or similar to the inductor device 1000, which will not be described repeatedly herein.

In some embodiments, the first coil C1 of the inductor device 6000 includes an upper half 6111, a lower half 6112 and a connector 6113, and the second coil C2 of the inductor device 6000 includes an upper half 6211, a lower half 6212 and a connector 6213. In some embodiments, the first coil C1 is interlaced with the second coil C2 on the first side S1 and the second side S2 of the inductor device 6000. In detail, the upper half 6111 of the first coil C1 is interlaced with the lower half 6212 of the second coil C2 on the first side S1 of the inductor device 6000, and the connector 6113 of the first coil C1 is interlaced with the connector 6213 of the second coil C2 on the second side S2 of the inductor device 6000.

In some embodiments, one terminal of the connector 6113 of the first coil C1 is coupled to the lower half 1132 of the toroidal coil C3, and the other terminal of the connector 6113 is coupled to the upper half 6211 of the second coil C2. In some embodiments, one side of the connector 6213 of the second coil C2 is coupled to the upper half 1131 of the toroidal coil C3, and the other side of the connector 6213 is coupled to the lower half 6112 of the first coil C1.

In some embodiments, the inductor device 6000 shown in FIG. 7 is a structure with substantially mirror symmetry.

In some embodiments, the inductor device 1000, the inductor device 1000A, the inductor device 4000, the inductor device 5000 and the inductor device 6000 are octagon structure. It should be understood that, in other embodiments, the inductor devices mentioned above can be other polygons. In addition, it should be understood that, the first wires and the second wires in the inductor device 1000, the inductor device 1000A, the inductor device 4000, the inductor device 5000 and the inductor device 6000 are exemplary embodiments, the number of the first wires and the second wires will not be limited thereto.

Figure 8:
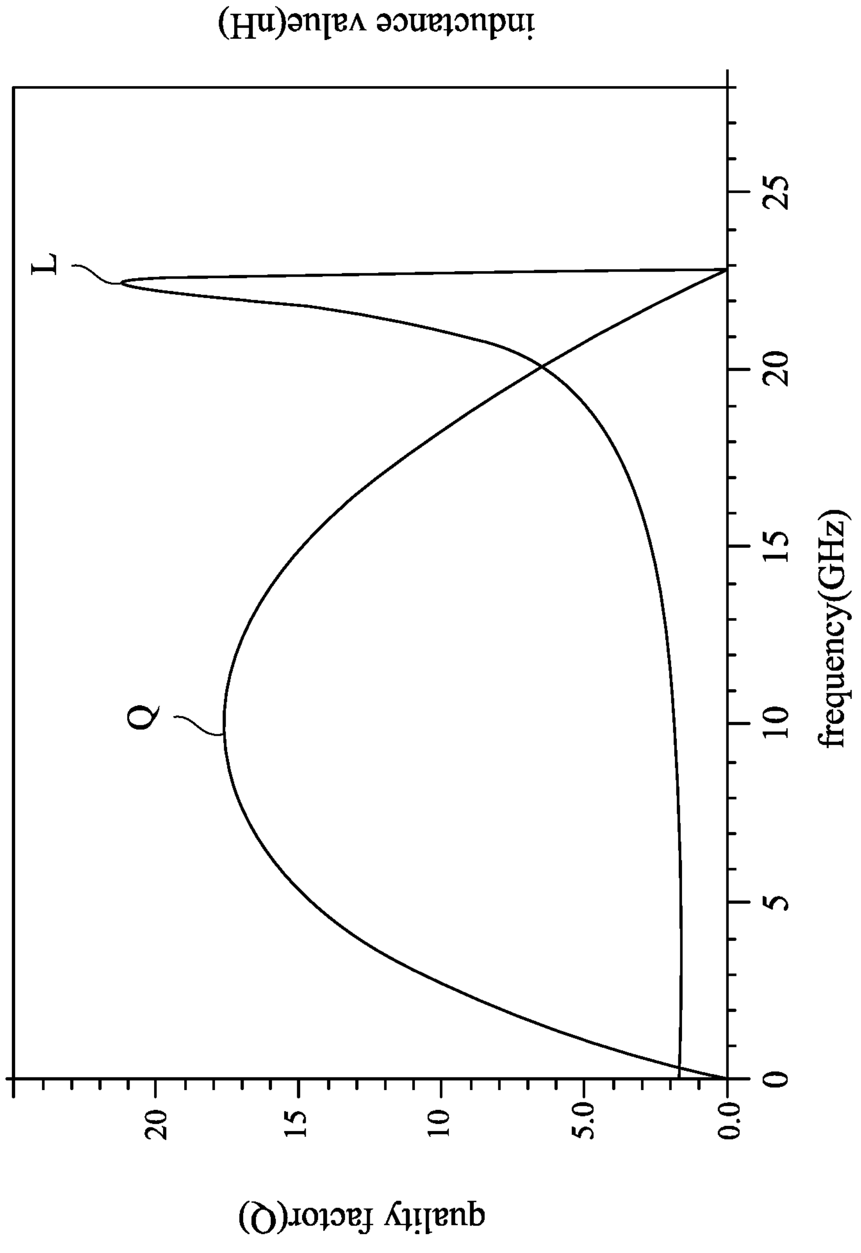
FIG. 8 is a schematic diagram illustrating experimental data of the inductor device shown in FIG. 1, in accordance with some embodiments of the present disclosure.

FIG. 8 is a schematic diagram illustrating experimental data of the inductor device 1000, in accordance with some embodiments of the present disclosure. As shown in FIG. 8, with the structural configuration according to the present disclosure, the experimental curve of the quality factor is Q and the experimental curve of the inductance value is L. As can be seen from the figure, the inductor device 1000 with the structure of the present disclosure has better quality factor and inductance value. For example, the inductor device 1000 has an inductance value that can reach about 1.7 nH and a quality factor (Q) of about 14.4 at a frequency of 5 GHz, and has an inductance value that can reach about 1.85 nH and a quality factor (Q) of about 17.5 at a frequency of 10 GHz, within an area of 150 μm*150 μm.

In sum, the inductor device 1000, the inductor device 1000A, the inductor device 4000, the inductor device 5000, and the inductor device 6000 provided in the present disclosure have advantage of reducing the inductor area and the self-resonance frequency (Fsr) can be increased. In addition, by the coil configuration in the present disclosure, inductance value can be increased while maintaining a sufficiently high quality factor.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An inductor device, comprising:
- a first coil wound in a first winding direction;
- a second coil wound in a second winding direction, wherein the second coil is at least partially overlapped with the first coil in a vertical direction, and the vertical direction is substantially perpendicular to the first winding direction and the second winding direction; and
- a toroidal coil, disposed outside the first coil and the second coil,
- wherein the first coil is interlaced with the second coil at a first side and a second side of the inductor device;
- wherein the toroidal coil surrounds the first coil and the second coil to form a ring shape;
- wherein the first winding direction of the first coil is substantially parallel to the second winding direction of the second coil at a first area that the second coil is at least partially overlapped with the first coil;
- wherein the first winding direction of the first coil is substantially perpendicular to the second winding direction of the second coil at a second area that first coil is interlaced with the second coil.

2. The inductor device of claim 1, wherein the first side is disposed on one side opposite to the second side.

3. The inductor device of claim 1, wherein the second coil is disposed above the first coil or below the first coil.

4. The inductor device of claim 1, wherein the first coil and the second coil are disposed on different metal layers.

5. The inductor device of claim 1, wherein the first coil and the toroidal coil are disposed on a same metal layer.

6. The inductor device of claim 1, wherein the first coil is wound out clockwise or counterclockwise from an innermost circle of the inductor device.

7. The inductor device of claim 6, wherein when the first coil is wound out clockwise from the innermost circle of the inductor device, the second coil is wound out counterclockwise from the innermost circle of the inductor device.

8. The inductor device of claim 6, wherein when the first coil is wound out counterclockwise from the innermost circle of the inductor device, the second coil is wound out clockwise from the innermost circle of the inductor device.

9. The inductor device of claim 1, wherein the toroidal coil comprises an opening at the first side and the second side respectively, and a first terminal of each opening is coupled to the first coil, and a second terminal of each opening is coupled to the second coil.

10. The inductor device of claim 1, further comprising:
- an input and output terminal, disposed on a third side of the inductor device.

11. The inductor device of claim 1, further comprising:
- a center-tapped terminal, disposed on a third side of the inductor device.

12. The inductor device of claim 11, further comprising:
- an input and output terminal, disposed on the third side of the inductor device.

13. The inductor device of claim 12, wherein the toroidal coil comprises an inner wire and an outer wire, wherein the inner wire is coupled to the outer wire, through a connector, on a fourth side of the inductor device.

14. The inductor device of claim 11, wherein the center-tapped terminal is coupled to one of the toroidal coil, the first coil, and the second coil.

15. The inductor device of claim 1, wherein the first coil comprises a plurality of first wires, and the second coil comprises a plurality of second wires.

16. The inductor device of claim 15, wherein at least one of the plurality of second wires is completely overlapped with at least one of the plurality of first wires at the first side or the second side of the inductor device.

17. The inductor device of claim 15, wherein one of the plurality of first wires is coupled to one of the plurality of second wires at an innermost circle of the inductor device and at the first side of the inductor device, wherein another of the plurality of first wires is coupled to another of the plurality of second wires at the innermost circle of the inductor device and at the second side of the inductor device.

18. The inductor device of claim 15, wherein one of the plurality of second wires is partially overlapped with the two of the plurality of first wires at a third side of the inductor device.

19. The inductor device of claim 1, wherein the first coil further comprises a first connector, and the second coil further comprises a second connector, wherein the first connector is interlaced with the second connector on the second side of the inductor device.

20. The inductor device of claim 19, wherein the first connector is configured to connect the toroidal coil with the second coil on the second side of the inductor device, wherein the second connector is configured to connect the toroidal coil with the first coil on the second side of the inductor device.

* * * * *